US011782871B2

(12) United States Patent
Norrie

(10) Patent No.: US 11,782,871 B2
(45) Date of Patent: Oct. 10, 2023

(54) METHOD AND APPARATUS FOR DESYNCHRONIZING EXECUTION IN A VECTOR PROCESSOR

(71) Applicant: Microchip Technology Inc., Chandler, AZ (US)

(72) Inventor: Christopher I. W. Norrie, Castro Valley, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 17/701,582

(22) Filed: Mar. 22, 2022

(65) Prior Publication Data
US 2022/0342844 A1 Oct. 27, 2022

Related U.S. Application Data

(60) Provisional application No. 63/180,601, filed on Apr. 27, 2021, provisional application No. 63/180,634, filed on Apr. 27, 2021, provisional application No. 63/180,562, filed on Apr. 27, 2021.

(51) Int. Cl.
*G06F 15/80* (2006.01)

(52) U.S. Cl.
CPC .............................. *G06F 15/8061* (2013.01)

(58) Field of Classification Search
None
See application file for complete search history.

(56) References Cited

U.S. PATENT DOCUMENTS

| 5,050,067 A | 9/1991 | McLagan et al. |
| 5,590,353 A | 12/1996 | Sakakibara et al. |
| 5,754,876 A * | 5/1998 | Tamaki ................. G06F 9/3455 710/52 |
| 6,088,783 A | 7/2000 | Morton |
| 6,101,596 A * | 8/2000 | Tanaka ................. G06F 9/3857 712/216 |
| 6,138,210 A | 10/2000 | Tremblay et al. |
| 6,170,054 B1 | 1/2001 | Poplingher |
| 6,212,630 B1 | 4/2001 | Takayama et al. |

(Continued)

FOREIGN PATENT DOCUMENTS

| GB | 2365588 A | 2/2002 |
| WO | 9110194 A1 | 7/1991 |
| WO | 2010095944 A1 | 8/2010 |

OTHER PUBLICATIONS

PCT/US2022/021525, Invitation to Pay Additional Fees and, Where Applicable, Protest Fees, European Patent Office, mailed Jul. 1, 2022.

(Continued)

*Primary Examiner* — Eric Coleman
(74) *Attorney, Agent, or Firm* — GLASS AND ASSOCIATES; Kenneth Glass; Alan Heimlich

(57) ABSTRACT

In one implementation a vector processor unit having preload registers for at least some of vector length, vector constant, vector address, and vector stride. Each preload register has an input and an output. All the preload register inputs are coupled to receive a new vector parameters. Each of the preload registers' outputs are coupled to a first input of a respective multiplexor, and the second input of all the respective multiplexors are coupled to the new vector parameters.

9 Claims, 7 Drawing Sheets

(56) References Cited

U.S. PATENT DOCUMENTS

| | | | |
|---|---|---|---|
| 7,058,765 B2 | 6/2006 | Chauvel et al. | |
| 7,340,590 B1 * | 3/2008 | Sugumar | G06F 9/3857 712/216 |
| 7,356,722 B2 | 4/2008 | Lau et al. | |
| 7,454,554 B1 | 11/2008 | Norrie et al. | |
| 7,634,586 B1 | 12/2009 | Norrie | |
| 7,660,967 B2 | 2/2010 | Hutson | |
| 7,734,977 B2 | 6/2010 | Ornes et al. | |
| 7,848,319 B2 | 12/2010 | Ornes et al. | |
| 7,995,696 B1 | 8/2011 | Norrie | |
| 8,069,392 B1 | 11/2011 | Norrie | |
| 8,161,210 B1 | 4/2012 | Norrie | |
| 8,285,884 B1 | 10/2012 | Norrie | |
| 8,327,243 B1 | 12/2012 | Norrie | |
| 8,397,144 B1 | 3/2013 | Norrie et al. | |
| 8,707,122 B1 | 4/2014 | Micheloni et al. | |
| 8,935,598 B1 | 1/2015 | Norrie | |
| 8,984,365 B1 | 3/2015 | Norrie | |
| 8,984,376 B1 | 3/2015 | Norrie | |
| 8,990,661 B1 | 3/2015 | Micheloni et al. | |
| 9,092,353 B1 | 7/2015 | Micheloni et al. | |
| 9,128,858 B1 | 9/2015 | Micheloni et al. | |
| 9,235,488 B2 | 1/2016 | Norrie | |
| 9,397,701 B1 | 7/2016 | Micheloni et al. | |
| 9,448,881 B1 | 9/2016 | Micheloni et al. | |
| 9,450,610 B1 | 9/2016 | Micheloni et al. | |
| 9,590,656 B2 | 3/2017 | Micheloni et al. | |
| 9,813,080 B1 | 11/2017 | Micheloni et al. | |
| 10,230,396 B1 | 3/2019 | Micheloni et al. | |
| 10,915,478 B2 | 2/2021 | Chafin et al. | |
| 2001/0010071 A1 | 7/2001 | Vlot et al. | |
| 2008/0071991 A1 | 3/2008 | Shaw et al. | |
| 2008/0222441 A1 | 9/2008 | Olofsson | |
| 2012/0151156 A1 | 6/2012 | Citron et al. | |
| 2015/0039862 A1 * | 2/2015 | Barowski | G06F 9/30145 712/218 |
| 2016/0162422 A1 | 6/2016 | Weber | |
| 2017/0024323 A1 * | 1/2017 | Havlir | G06F 9/3857 |
| 2017/0097909 A1 | 4/2017 | Simionescu et al. | |
| 2018/0336456 A1 | 11/2018 | Norrie et al. | |
| 2022/0342590 A1 | 10/2022 | Norrie | |
| 2022/0342668 A1 | 10/2022 | Norrie | |

OTHER PUBLICATIONS

Kauffman, "Function Call Stack Examples", George Mason University, Nov. 22, 2017, 17 pages, Retrieved from the Internet< URL: https://web.archive.org/web/20171122041013/http://cs.gmu.edu/-kauffman/cs222/stack-demo.html.

Wikipedia, "Call stack", Jan. 13, 2021, 8 pages.

Wilson, "6502 Stacks Treatise—Parameter-passing methods", Dec. 28, 2019, 12 pages, Retrieved from the Internet.

PCT/US2022/021525, International Search Report and Written Opinion, European Patent Office, dated Aug. 9, 2022.

U.S. Appl. No. 17/669,995, filed Feb. 11, 2022, Christopher I. W. Norrie.

U.S. Appl. No. 63/180,634, filed Apr. 27, 2021, Christopher I. W. Norrie.

* cited by examiner

METHOD AND APPARATUS FOR DESYNCHRONIZING EXECUTION IN A VECTOR PROCESSOR

RELATED APPLICATION

This patent application claims priority of U.S. Application Ser. No. 63/180,634 filed Apr. 27, 2021 by the same inventor titled "Method and Apparatus for Programmable Machine Learning and Inference" which is hereby incorporated herein by reference. This patent application claims priority of U.S. Application Ser. No. 63/180,562 filed Apr. 27, 2021 by the same inventor titled "Method and Apparatus for Gather/Scatter Operations in a Vector Processor" which is hereby incorporated herein by reference. This patent application is related to pending U.S. application Ser. No. 17/669,995 filed Feb. 11, 2022 by the same inventor titled "Method and Apparatus for Gather/Scatter Operations in a Vector Processor" which is hereby incorporated herein by reference. This patent application claims priority of U.S. Application Ser. No. 63/180,601 filed Apr. 27, 2021 by the same inventor titled "System of Multiple Stacks in a Processor Devoid of an Effective Address Generator" which is hereby incorporated herein by reference. This patent application is related to pending U.S. application Ser. No. 17/468,574 filed Sep. 7, 2021 by the same inventor titled "System of Multiple Stacks in a Processor Devoid of an Effective Address Generator" which is hereby incorporated herein by reference.

FIELD

The present method and apparatus pertain to a vector processor. More particularly, the present method and apparatus relates to a Method and Apparatus for Desynchronizing Execution in a Vector Processor.

BACKGROUND

For improved throughput a vector processing unit (VPU) accesses vectors in memory and performs vector operations at a high rate of speed in a continuous fashion. Thus the disruption of the vector pipeline for any reason, such as, for example to handle serial or scalar operations or housekeeping instructions comes at a high cost in lowered performance as vector processors are built for brute speed.

This presents a technical problem for which a technical solution is needed using a technical means.

BRIEF SUMMARY

A vector processor unit is provided with preload registers for vector length, vector constant, vector address, and vector stride, with each preload register having an input and an output. All the preload register inputs are coupled to receive new vector parameters. Each of the preload registers' outputs are coupled to a first input of a respective multiplexor, and a second input of all the respective multiplexors are coupled to receive the new vector parameters.

BRIEF DESCRIPTION OF THE DRAWINGS

The techniques disclosed are illustrated by way of examples and not limitations in the figures of the accompanying drawings. Same numbered items are not necessarily alike.

The accompanying Figures illustrate various non-exclusive examples of the techniques disclosed.

DETAILED DESCRIPTION

Figure 1:
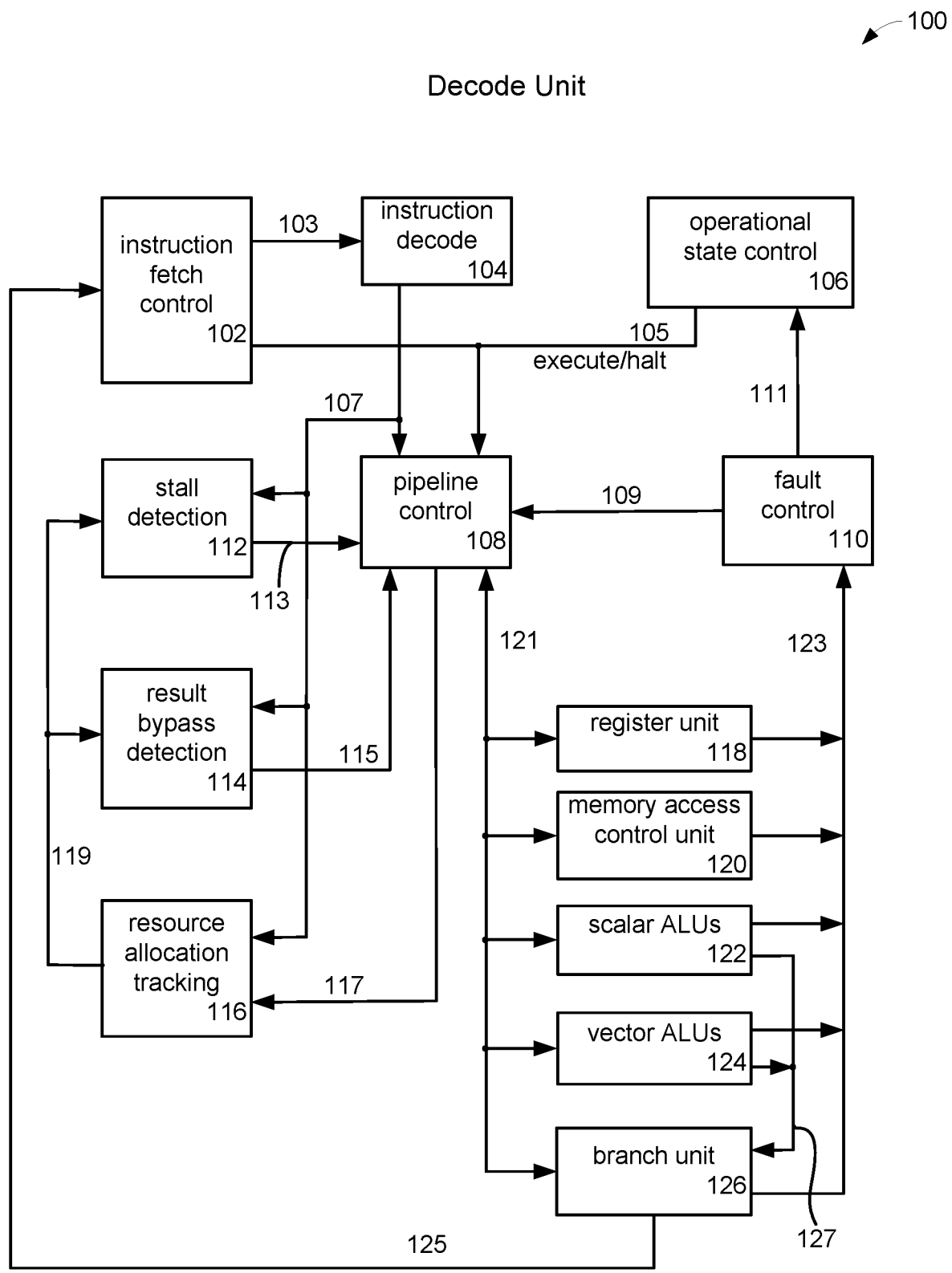
FIG. 1 illustrates, generally at 100, a block diagram overview of a decode unit according to an example.

A Method and Apparatus for Desynchronizing Execution in a Vector Processor is disclosed.

DEFINITIONS and NOTES

Various terms are used to describe the techniques herein disclosed. Applicant is the lexicographer and defines these terms as follows. Terms are quoted upon their initial usage below.

"Concurrent" is the same as "parallel" and is defined as two things that are at least partially going on at once. It does not imply anything about how they relate to one another—they could be "synchronized" or "desynchronized".

"Synchronized" execution—is the act of the pipeline control controlling every aspect of the instruction's operation.

"Desynchronized" execution—is the act of an instruction performing a substantial component of its operation independent of the pipeline control. The pipeline control can therefore control execution and completion of one or more instructions following the instruction undergoing desynchronized execution prior to completion of the desynchronized execution.

Note that execution of instructions subsequent to a desynchronized instruction is considered to modify a critical processor state if it makes unacceptable changes to the results of the program executing on the processor. An unacceptable change is a final result of all processing for a given program that is different than if all the instructions were executed in a serial fashion, that is each instruction executing to completion before the next instruction begins. A critical processor state is one that must be maintained to avoid an unacceptable change. Changes that are acceptable may include, but are not limited to, the order faults or interrupts occur and updates to program visible registers occurring out of order with respect to the desynchronized instruction (but not out of order with respect to non-desynchronized instructions). Note that changes that would be considered unacceptable are prohibited from occurring through a process of resynchronized execution.

"Desynchronized instruction"—is an instruction whose execution is not 100% under control of the pipeline control, i.e. a substantial component of its operation is not under control of the pipeline control, however the pipeline control can monitor its progression.

"Non-desynchronized instruction"—is an instruction that does not execute desynchronously.

"Resynchronized" execution stops an instruction subsequent to a desynchronized instruction from executing until the desynchronized instruction completes. This occurs if the subsequent instruction would modify a critical processor state, in particular if that processor state would affect the results of the desynchronized instruction.

"Asynchronous" instruction/execution—an instruction, as part of its execution, invokes activity external to the processor that will complete in a time completely uncontrolled and unpredictable by the processor. The pipeline control cannot monitor its progression. Meanwhile the processor can continue executing instructions.

"Asynchronous reserialization" waits for an asynchronous execution to complete before allowing a subsequent instruction to execute. Generally, this is in order to maintain integrity of the programs results.

Note that the difference between desynchronized and asynchronous is subtle. In desynchronized execution the processor has complete control over the two instructions that are executing even though it allows the second instruction to modify processor state before the first (desynchronized) instruction has completed. In asynchronous execution, the processor has zero (no) control of the timing in which the activity external to the processor invoked by the asynchronous instruction will complete.

Note we use the term desynchronized execution when allowing non-vector instructions to execute after a vector instruction has started but not completed. The execution of the vector instruction is considered desynchronized from the subsequent non-vector instructions that are allowed to execute.

However, the desynchronization method disclosed is not so limited. That is, while we generally discuss non-vector instructions that execute when a desynchronized vector instruction executes for clarity of explanation, the desynchronization method disclosed is not so limited. In alternative implementations, a second vector instruction may be allowed to execute in a desynchronized manner while a first desynchronized vector instruction is executing. Furthermore, other long running instructions (i.e. taking a longer time than other instructions to complete execution), other than vector instructions, are also candidates for desynchronized execution.

Note we use the term asynchronous execution for example for the external load memory (xload) and external save memory (xsave) instructions that request processing machines external to the vector processing unit (VPU) to coordinate the movement of data between the VPU's memory and external memory.

"Modifying/changing/copying/transferring registers" refers to modifying/changing/copying/transferring values or parameters stored within register(s). That is, for example, copying a first register to a second register is to be understood as copying the contents or parameters contained or held in the first register into the second register such that the second register now contains the value or parameter of the first register.

"Contention" refers to two or more processes, such as, but not limited to, executing instructions trying to alter or access the same entity, such as, but not limited to a memory or register where the alteration would introduce uncertainty in the result of processing. For example, if two executing instructions are attempting to both alter a specific memory location, this is contention for the resource, i.e. contention for the same specific memory location. The contention may result in a different result in processing depending on which instruction completes execution first. For example, a desynchronization contention, is a contention between an executing desynchronized instruction and another instruction that will affect the processor output resulting in a different output depending upon which instruction completes execution first. For example, an asynchronous contention, is a contention between an executing asynchronous instruction and another instruction that will affect the processor output resulting in a different output depending upon which instruction completes execution first.

"Vector parameters/new vector parameters" refers to information about a vector. In one example it may be a plurality of signals. More specifically it is information needed by the processor to access memory (e.g. read and write a vector). "new" refers to the situation where the processor is already using vector parameters and a new vector operation is being queued up or placed in the pipeline for future execution, the vector parameters for this vector operation are called "new vector parameters" to distinguish them from vector parameters that are currently being used in a vector instruction that is executing.

DESCRIPTION

In one example a vector processor unit having preload registers for vector length, vector constant, vector address, and vector stride is provided. Each preload register has a respective input and a respective output. All the preload register inputs are coupled to receive a new vector parameters. Each of the preload registers' outputs are coupled to a first input of a respective multiplexor, and a second input of all the respective multiplexors is coupled to receive the new vector parameters.

In one example disclosed are mechanisms that determine when desynchronized and asynchronous execution can occur and mechanisms that stop instruction execution if the desynchronized and/or asynchronous execution must complete (called resynchronization and asynchronous reserialization respectively), generally in order to maintain integrity of the programs results. The methods disclosed not only allow desynchronized and asynchronous execution but also limit the cases when resynchronization or asynchronous reserialization is to be performed since resynchronization and asynchronous reserialization reduce program performance.

FIG. 1 illustrates, generally at 100, a block diagram overview of a decode unit. At 102 is an instruction fetch control which fetches instructions from a memory system. The memory system, while not germane to the understanding of the decode unit 100 can be, for example, random access memory (RAM). The instruction fetch control 102 outputs via 103 information to instruction decode 104, and outputs via 105 execute/halt information to operation state control 106 and to pipeline control 108. The instruction decode 104 outputs via 107 information to stall detection 112, result bypass detection 114, and resource allocation tracking 116. Pipeline control 108 outputs via 117 information to resource allocation tracking 116. Resource allocation tracking 116 outputs via 119 information to result bypass detection 114, and stall detection 112. Result bypass detection 114 outputs via 115 information to pipeline control 108. Stall detection 112 outputs via 113 information to pipeline control 108. Pipeline control 108 via 121 outputs and receives information to/from register unit 118, memory access control unit 120, scalar arithmetic logic units (ALUs) 122, vector arithmetic logic units (ALUs) 124 and branch unit 126. Branch unit 126 outputs via 125 information to instruction fetch control 102. Branch unit 126 outputs via 123 information to fault control 110. Vector ALUs 124 outputs via 123 information to fault control 110. Scalar ALUs 122 outputs via 123 information to fault control 110. Memory access control unit 120 outputs via 123 information to fault control 110. Register unit 118 outputs via 123 information to fault control 110. Fault control 110 outputs via 109 to pipeline control 108, and via 111 to operational state control 106. Branch unit 126 receives via 127 information output from scalar ALUs 122 and information from vector ALUs 124.

For sake of a simple germane discussion, from FIG. 1 it can be seen that pipeline control 108 communicates, inter-alia, with register unit 118, memory access control unit 120, scalar ALUs 122, and vector ALUs 124. Pipeline control 108 attempts to keep the processor in which decode unit 100 is situated running as fast as it can by trying to avoid stopping any scalar or vector ALUs from serially processing what can be done in parallel. It is in a simple sense a traffic cop directing traffic so as to improve throughput.

In a processor capable of performing both scalar and vector operations it is preferable to keep the vector ALUs operating at the highest rate of speed possible because vector operations involve more processing than scalar operations, and thus substantially determine the overall processing rate.

Figure 2:
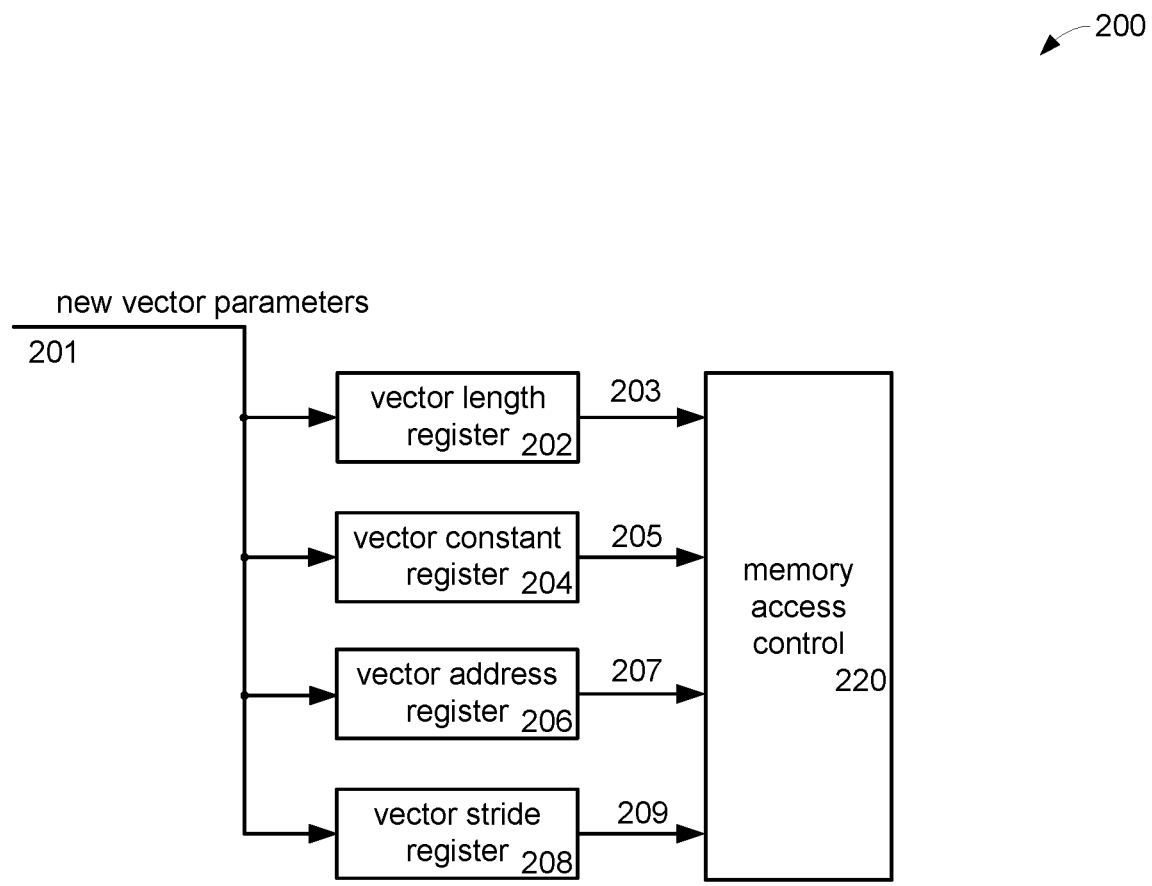
FIG. 2 illustrates, generally at 200, a block diagram overview of vector registers for addressing a memory access control.

FIG. 2 illustrates, generally at 200, a block diagram overview of vector registers for addressing a memory access control. At 201 is new vector parameters, i.e. 201 represents the receipt of new vector parameters 201 to be loaded. New vector parameters 201 is coupled to the input of vector length register 202 and the output of vector length register 202 is coupled via 203 to memory access control 220. New vector parameters 201 is also coupled to the input of vector constant register 204 and the output of vector length register 202 is coupled via 205 to memory access control 220. New vector parameters 201 is also coupled to the input of vector address register 206 and the output of vector length register 206 is coupled via 207 to memory access control 220. New vector parameters 201 is coupled to the input of vector stride register 208 and the output of vector stride register 208 is coupled via 209 to memory access control 220. While vector length register 202, vector constant register 204, vector address register 206 and vector stride register 208 are illustrated, in some examples one or more of vector length register 202 and vector constant register 204 are not provided.

Memory access control 220 is a functional block, not a register. It takes in as inputs the vector length provided via 203 from vector length register 202, the vector constant provided via 205 from vector constant register 204, the vector address provided via 207 from vector address register 206, and the vector stride provided via 209 from the vector stride register 208. The combination of vector length register 202, vector constant register 204, vector address register 206 and vector stride register 208 can be called Vector Control and memory access control 220 can be called a Memory Subsystem. That is Vector Control controls addressing to a Memory Subsystem. The Memory Subsystem can include RAM (not shown).

Upon understanding FIG. 3 described below, the reader will recognize that FIG. 2 as illustrated is an example of an apparatus that does not support vector desynchronization in vector memory control whereas FIG. 3 as illustrated is an example of an apparatus that does support vector desynchronization in vector memory control.

Figure 3:
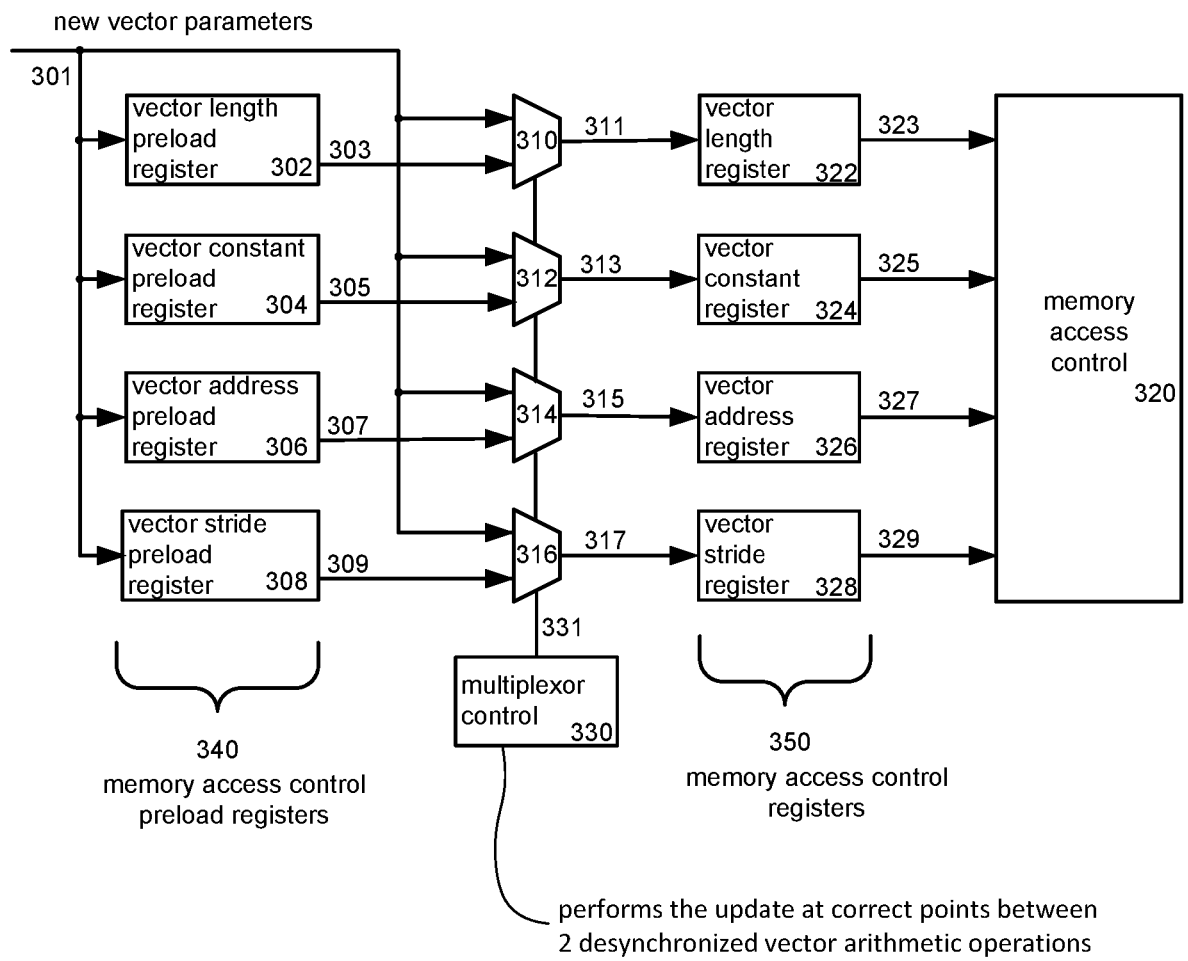
FIG. 3 illustrates, generally at 300, a block diagram overview of a portion of a vector processor unit comprising memory access control preload registers.

FIG. 3 illustrates, generally at 300, a block diagram overview of a portion of a vector processor unit comprising memory access control preload registers.

At 301 is a new vector parameters. New vector parameters 301 is coupled to the input of vector length preload register 302 and the output of vector length preload register 302 is coupled via 303 to a first input of a respective multiplexor 310. The second input of multiplexor 310 is coupled to new vector parameters 301, i.e. bypassing vector length preload register 302. The output of multiplexor 310 is coupled via 311 to a vector length register 322. The output of vector length register 322 is coupled via 323 to memory access control 320.

New vector parameters 301 is coupled to the input of vector constant preload register 304 and the output of vector constant preload register 304 is coupled via 305 to a first input of respective multiplexor 312. The second input of multiplexor 312 is coupled to new vector parameters 301, i.e. bypassing vector constant preload register 304. The output of multiplexor 312 is coupled via 313 to a vector constant register 324. The output of vector constant register 324 is coupled via 325 to memory access control 320.

New vector parameters 301 is coupled to the input of vector address preload register 306 and the output of vector address preload register 306 is coupled via 307 to a first input of respective multiplexor 314. The second input of multiplexor 314 is coupled to new vector parameters 301 i.e. bypassing vector address preload register 306. The output of multiplexor 314 is coupled via 315 to a vector constant register 326. The output of vector constant register 326 is coupled via 327 to memory access control 320.

New vector parameters 301 is coupled to the input of vector stride preload register 308 and the output of vector stride preload register 308 is coupled via 309 to a first input of multiplexor 316. The second input of multiplexor 316 is coupled to new vector parameters 301 i.e. bypassing vector stride preload register 308. The output of multiplexor 316 is coupled via 317 to a vector stride register 328. The output of vector stride register 328 is coupled via 329 to memory access control 320.

While vector length preload register 302, vector constant preload register 304, vector address preload register 306, vector stride preload register 208, vector length register 322, vector constant register 324, vector address register 326 and vector stride register 328, with the respective multiplexors 310, 312, 314, 316 are illustrated, in some examples one or more of vector length preload register 302, vector length register 322, vector constant register 304 and vector constant register 324, and the respective multiplexors, are not provided.

At 330 is multiplexor control. An output of multiplexor control 330 is coupled via 331 to respective control inputs of multiplexor 316, multiplexor 314, multiplexor 312, and multiplexor 310. That is, control inputs of multiplexor 316, multiplexor 314, multiplexor 312, and multiplexor 310 are all controlled via link 331 which is output from multiplexor control 330. In one example link 331 carries a single signal to all of the control inputs of multiplexor 316, multiplexor 314, multiplexor 312, and multiplexor 310, and in another example link 331 carries a respective signal to each of the control inputs of multiplexor 316, multiplexor 314, multiplexor 312, and multiplexor 310, so that they are individually controllable.

Multiplexor control 330 identifies whether memory access control registers 350 are to be loaded with new vector parameters setup 301 or from the respective outputs of memory access control preload registers 340, as described below, and therefore controls link 331 to as to update memory access control registers 350 at correct points between 2 desynchronized vector arithmetic operations. The update is from the preload registers (302, 304, 306, 308) to the registers (322, 324, 326, 328), or from new vector parameter 301 to the registers (322, 324, 326, 328). As described below, multiplexor control 330 further controls writing to each of the preload registers (302, 304, 306, 308) and the registers (322, 324, 326, 328).

Vector length preload register 302, vector constant preload register 304, vector address preload register 306, and vector stride preload register 308 together comprise memory access control preload registers 340. Individually each of vector length preload register 302, vector constant preload register 304, vector address preload register 306, and vector stride preload register 308 are considered a memory access control preload register.

Vector length register 322, vector constant register 324, vector constant register 326, and vector stride register 328. Individually each of vector length register 322, vector constant register 324, vector constant register 326, and vector stride register 328 together comprise memory access control registers 350. Individually each of vector length register 322, vector constant register 324, vector constant register 326, and vector stride register 328 are considered a memory access control register.

Memory access control 320 is a functional block, not a register. It takes in as inputs the vector length, the vector constant, the vector address, and the vector stride registers values (provided by respective memory access control registers 322, 324, 326, 328 via respective links 323, 325, 327, 329). Registers, 322, 324, 326, 328, and their respective parameters communicated via links 323, 325, 327, 329, are what can be called Vector Control and memory access control 320 can be called a Memory Subsystem. That is Vector Control controls addressing to a Memory Subsystem. The Memory Subsystem can include RAM (not shown).

The multiplexor control 330 is considered to be in a non-preload position when new vector parameters 301 pass through multiplexors 310, 312, 314, and 316 respectively, and then via 311, 313, 315, and 317 respectively, into vector length register 322, vector constant register 324, vector constant register 326, and vector stride register 328.

The multiplexor control 330 is considered to be in a preload position when multiplexors 310, 312, 314, and 316 respectively receive inputs from vector length preload register 302, vector constant preload register 304, vector address preload register 306, and vector stride preload register 308 respectively via 303, 305, 307, and 309 respectively.

That is in the non-preload position the memory access control registers 350 receive parameters from the new vector parameters 301. In the preload position the memory access control registers 350 receive parameters from the memory access control preload registers 340.

Not shown so as not to obscure the example is that the multiplexor control 330 controls write signals to the access control registers 350 and the memory access control preload registers 340. In this way multiplexor control 330 controls which registers receive the new vector parameters 301.

In FIG. 3 multiplexor 310 is considered a first multiplexor.

In FIG. 3 multiplexor 312 is considered a second multiplexor.

In FIG. 3 multiplexor 314 is considered a third multiplexor.

In FIG. 3 multiplexor 316 is considered a fourth multiplexor.

Figure 4:
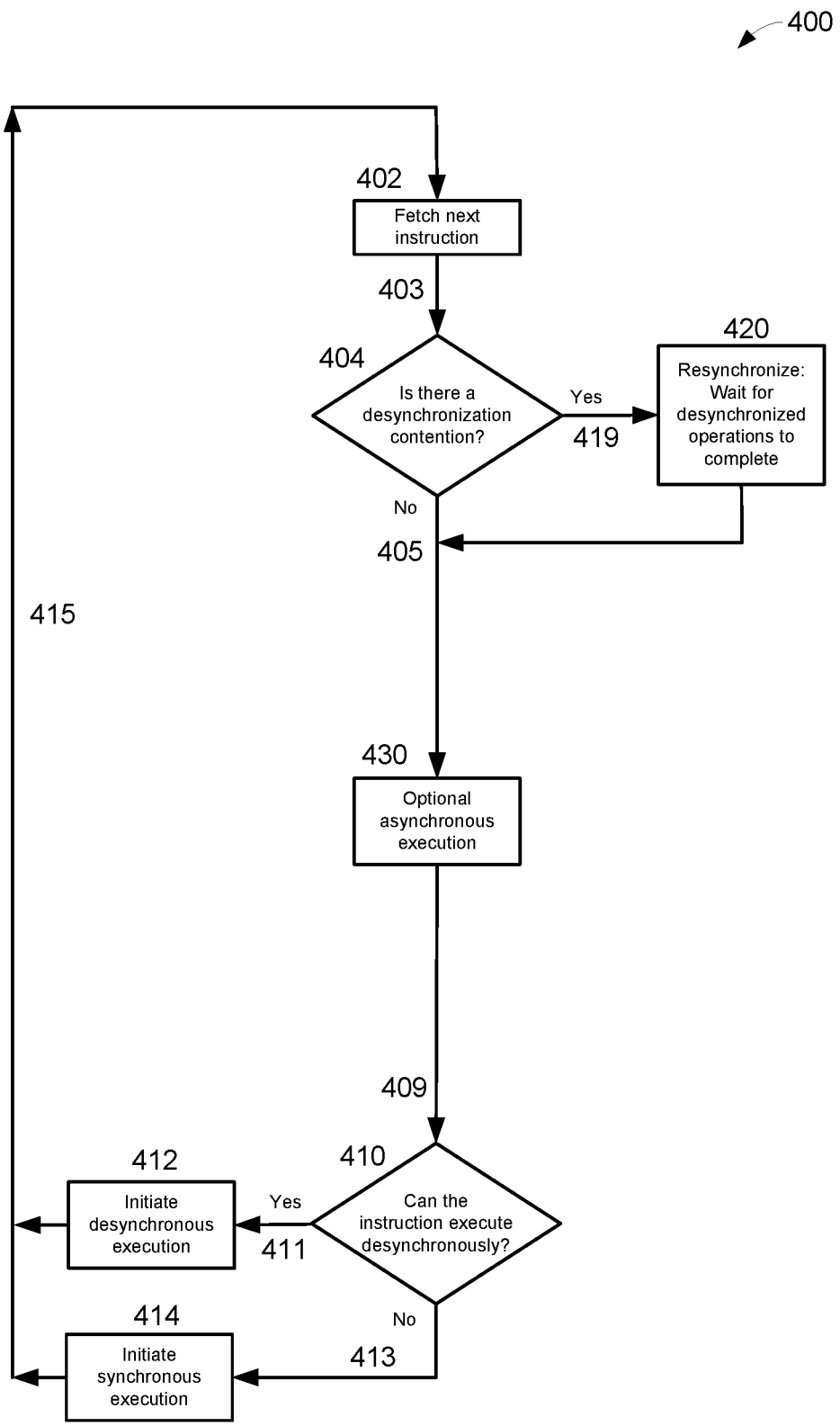
FIG. 4 illustrates, generally at 400, a flowchart showing desynchronous execution of an instruction and synchronous execution of an instruction.

FIG. 4 illustrates, generally at 400, a flowchart showing desynchronous execution of an instruction and synchronous execution of an instruction. At 402 fetch the next instruction to execute. The proceed via 403 to 404. At 404 determine if the next instruction to execute affects or is dependent on the results of any current desynchronized instruction in progress. When the next instruction to execute affects or is dependent on the results of any current desynchronized instruction in progress, this being called a desynchronization contention (Yes) then go via 419 to 420. When the next instruction to execute does not affect or is not dependent on the results of any current desynchronized instruction in progress (No) go via 405 to 430 Optional asynchronous execution. At 420 resynchronize execution by waiting for all desynchronized operations to complete before proceeding via 405 to 430 to Optional asynchronous execution. When there is no optional asynchronous execution 430 then proceed via 409 to 410.

At 410 determine if the fetched next instruction can execute desynchronously. When the next instruction can execute desynchronously (Yes) then proceed via 411 to 412. At 412 initiate desynchronous execution by allowing the processor to execute the fetched next instruction desynchronously, that is, the completion of the fetched next instruction occurs desynchronously with respect to the control of the processor but the processor tracks when an internal signal is given that indicates the operation is complete. The processor does not wait for this completion signal before continuing onto via 415 to 402.

When the next instruction cannot execute desynchronously (No) then proceed via 413 to 414. At 414 initiate desynchronous execution by allowing the processor to execute the fetched next instruction synchronously, that is, the instruction has the appearance to the program that it fully completes before continuing via 415 to 402. The processor may be pipelined or employ other overlapped execution techniques, however it does so in a manner that makes it appear to a program that it completes the instruction before continuing to 402.

Some operations are allowed to occur out of order and others are not. Not everything can be out of order otherwise the general integrity of a program (and therefore its usefulness) is undermined. To avoid instructions that can corrupt the processor state, there is provided a process called resynchronization, i.e. 420, that halts further execution until a desynchronized operation has completed. This impacts performance and this disclosure details the elimination of some of the causes of resynchronization, thereby speeding up program execution.

Knowing when there is desynchronized execution of one or more instructions, e.g. vector instruction, for example in FIG. 4 at 412, then the multiplexor control 330 in FIG. 3 can perform the updating of the memory access control registers 350 at correct points between the two desynchronized vector arithmetic operations.

One vector instruction can desynchronize from the executing instructions in the pipeline, allowing another instruction to execute. If a subsequent instruction has a resource contention with the desynchronized instruction then the subsequent instruction must wait until the contention goes away—this is one example of a desynchronization contention, as described in relation to 404. However, if you can execute a second vector instruction without causing a resource contention, the second vector instruction may execute desynchronized.

Instructions that qualify for desynchronized execution are any long running instruction as this allows subsequent instructions to complete their execution while the desynchronized instruction is executing. So, the execution time for subsequent instructions which are executed while the desynchronized instruction is executing is effectively reduced because they do not wait on the desynchronized instruction to complete execution.

Another way of looking at the examples disclosed herein is to see what instructions can execute when a desynchronized instruction is executing.

Since vector instructions are long running and represent the bulk of the work in a vector processor, ideally all non-vector instructions would be allowed to execute while a desynchronized vector instruction executes. If this can be achieved, then the processing time is bounded by the execution of the vector instructions as all other instructions would be executed while the desynchronized vector instructions are executing.

Vector instructions read operands from memory and write results to memory. Therefore, instructions that don't access memory are candidates for execution when a desynchronized vector instruction is executing. These instructions include all scalar arithmetic instructions whose operands come from, and result go to, a register set. It also includes instructions that access memory using either a different memory or a different region of memory than a desynchronized vector instruction. This can include subroutine call and returns, pushing and popping parameters from a stack, without limitation.

There are a class of instructions that may cause contention with a desynchronized vector instruction. For example, instructions that set up a subsequent vector operation (vector addresses in memory, vector lengths, without limitation) and modify resources that can adversely affect the currently executing desynchronized vector instruction.

For performance reasons, it would be desirable if these contention causing instructions could also execute in parallel with a desynchronized vector instruction.

If the processing of vectors represents the bulk of the work in a vector processor, then instructions that set up those vectors are also very common and having to resynchronize execution every time a new vector is being set up is a significant performance degradation.

Therefore, there is a need for instructions that set up memory access control preload registers (e.g. FIG. 3 at 340) that specify vector addresses, vector strides, vector lengths, and vector constant values so that the currently executing desynchronized vector instruction is not adversely affected.

Vector length, vector constant, vector address, and vector stride are entities that can reside in registers, for example, in memory access control registers 350 (e.g. 322, 324, 326, and 328 respectively) in FIG. 3 and via 323, 325, 327, and 329 respectively are in communication with memory access control 320. Vector length preload, vector constant preload, vector address preload, and vector stride preload are entities that can reside in memory access control preload registers 340 (e.g. 302, 304, 306, and 308 respectively in FIG. 3) and via 303, 305, 307, and 309 respectively are in communication with multiplexor 310, 312, 314, and 316 respectively. The vector length, vector constant, vector address, and vector stride, collectively called a vector port for ease of discussion, allow addressing a vector in the memory access control 320, called a memory for ease of discussion. Thus the vector port addresses the memory to point to a vector.

For example, a vector length, is a length of a vector in the memory.

For example, a vector constant is a constant that is used when operating on a vector. For example, if there is a need to multiply every element of a vector A by 2, then vector B, the multiplier, is a vector whose elements all have the value 2. Instead of requiring vector B to be resident in memory, the vector constant can be in a register that specifies the value of each element of vector B.

A vector address is an address where a vector is to be found. A vector stride is a stride value that is added to the vector address each time an access is made into memory for a vector element. For example, the stride may be equal to 1 if the vector is a row of a matrix but it may be set to N if it is a column of a matrix that has N elements in each row. Vector address, and vector stride are used to address memory locations where a vector can be read or written.

DETAILED INSTRUCTION EXECUTION EXAMPLES

Because the techniques disclosed are used for enhancing execution of a vector processor, these detailed examples are illustrative of the techniques.

First is shown an example of Desynchronized Execution. Then an example of Asynchronous Execution. And finally an example showing relevance with respect to co-pending application Ser. No. 17/468,574 filed Sep. 7, 2021 which describes a parameter stack, register stack, and subroutine call stack that are separated from the local memory, which is used extensively by the vector ALUs 124.

In the following examples these mnemonics mean the following:
mov - move
rX - register, where X is an integer number of the register
sas - set-address-and-stride
slen - set vector length
sqrt - square root
vX - vector, where X is an integer number of the vector
mem[Xs] - memory, where Xs are the memory addresses
add - addition
div - division
etc - etcetera, meaning possible continuing instructions
log - logarithm
// - a comment follows (not part of the executing code)
xload - load data from an external source
xsave - save data to an external destination
store - save in local memory
fetch - get from local memory

```
xswait - a stall instruction until an asynchronous xsave operation is complete
   push - put the value referenced onto the top of a stack
   call - passing control to the specified instructions/routine
       — a comment follows (not part of the executing code), and is an alternative
syntax to //
   xlwait - a stall instruction until an asynchronous xload operation is complete
```

In order to not confuse the reader, while in FIG. 1 box 124 indicates vector ALUs (plural) the examples below will consider the case where box 124 is a single vector ALU and will refer to it as vector ALU 124. The techniques disclosed are not so limited and multiple ALUs are possible.

```
Desynchronized Execution
========================
   mov r0 100 // r0 gets 100
   mov r1 1 // r1 gets 1
   sas0 r0 r1 // set-address-and-stride for vector 0, v0: address is 100,
stride is 1
   sas1 r0 r1 // set-address-and-stride for vector 1, v1: address is 100,
stride is 1
   mov r2 64 // r2 gets 64
   slen r2 // set vector length to 64, thus v0 v1 occupy memory locations
mem[100,101,102,...,163]
   sqrt v0 v1 // v0 gets the square root of v1, and since v0 and v1 have the
same address, v1 is also get the square root
   add r7 r8 // without desynchronization this instruction has to wait until
the previous sqrt instruction completes
   div r7 r9 // without desynchronization this instruction has to wait until the
previous sqrt instruction completes
   etc
```

There is no reason the instructions illustrated above that follow the sqrt instruction cannot execute while the sqrt instruction is executing. This means pipeline control, 108 (also called pipe control), needs to allow the sqrt instruction to execute desynchronized so pipeline control 108 can allow the execution of subsequent instructions (in the example above, add r7 r8, and div r7 r9).

However at some point pipeline control 108 may need to resynchronize a desynchronized operation if it is still in progress. For example, if the vector ALU, 124, only supports one vector operation at a time, then the following demonstrates a resynchronization:

```
   sqrt v0 v1 // this desynchronizes from pipeline control, i.e. allows the sqrt
instruction to execute desynchronized
   add r7 r8 // pipeline control allows this to execute
   div r7 r9 // pipeline control allows this to execute
   log v0 v1 // pipeline control must resynchronize since this cannot
execute yet due to resource contention (of v0 and v1), that is, log v0 v1 is attempting to use
v0 and v1 however we don't know if sqrt v0 v1 is finished yet (with v0 and v1), so it must
resynchronize
```

In the immediately above example the original vector is square-rooted then since no vector addresses were changed, the result of that square root will then be operated on by the logarithm function. But if vector ALU 124 can only perform one vector operation at a time, then the square root must complete before the logarithm can start. If the square root has not completed (monitored by resource allocation tracking 116) then the desynchronized sqrt must be resynchronized with the pipeline control's 108 execution, since the sqrt instruction has not been resynchronized. This is done by resource allocation tracking 116 indicating to stall detection 112 that a resynchronization needs to occur and stall detection 112 stalls pipe control 108 from executing the log instruction until the resynchronization is complete and vector ALU 124 is available.

Resynchronization represents a performance loss and, although sometimes necessary, is undesirable. Ideally, the vector ALU 124 should be kept as busy as possible, with a utilization as close to 100% as practical since the bulk of the work in a vector processor is the processing of vectors.

Consider the following example, which is representative of many common scenarios:

```
   mov r0 100 // same as the above example all the way down to the sqrt
   mov r1 1
   sas0 r0 r1
   sas1 r0 r1
   mov r2 64
```

-continued

```
   slen r2
   sqrt v0 v1
   mov r0 200 // set up a new vector operation for the operand and result
vectors in mem[200,201,202,295]
   mov r1 1
   sas0 r0 r1
   sas1 r0 r1
   mov r2 96
```

```
slen r2
   log v0 v1 // mem[200,201,202,295] gets the log of
mem[200,201,202,2095]
```

In this case, the second occurrence of the sas0, sas1, and slen instructions changes the locations in memory that define where the operand and result vectors reside. But if the sqrt instruction which is still executing desynchronized when these instructions are executed, they will adversely affect the sqrt because the vectors for the sqrt are unexpectedly having the address, strides, and lengths changed. So the second occurrence of sas0 must cause a resynchronization, which is not desirable.

FIG. 3, shows an example how resynchronization can be avoided.

The second occurrence of the sas0, sas1, and slen instructions can be allowed to execute while the desynchronized sqrt is executing by writing into the memory access preload registers 302, 306, and 308 the operand and result ports rather than writing into the memory access control registers 322, 326, and 328.

Multiplexor control 330, which is controlled by pipeline control 108 recognizes the attempt to modify one of the memory access control registers 350 while a desynchronized operation is in progress and instead causes the memory access control preload register 340 to be written instead, that is multiplexor control 330 decides whether the memory access control registers 350 or the memory access control preload registers 340 are written. Therefore, registers memory access control registers 350 are not affected by a subsequent instruction while a desynchronized operation is in progress and the desynchronized operation is therefore not adversely affected.

Pipeline control 108, further recognizes when the desynchronized operation is complete and if any of memory access control preload registers 340 have been modified then their contents are moved into the respective one of memory access control registers 350 by multiplexor control 330 of pipeline control 108. Thus, the full functionality required by the second execution of the sas0, sas1, and slen instruction is provided without them having to resynchronize, and therefore lose performance. The vector log instruction can now execute and, being a vector instruction, can execute in a desynchronized manner. If multiple vector instructions cannot execute in parallel, the vector log will resynchronize first, responsive to pipeline control 108, so that only one desynchronized vector instruction at a time is executing.

The above allows the vector unit to remain near 100% busy (ignoring any inefficiencies of startup in a particular implementation). The vector ALU 124, went from performing square-roots on each element of one vector to immediately performing logarithms on another vector, thereby satisfying the objective of keeping the vector ALU 124 nearly 100% busy.

Had the sqrt completed before the second occurrence of the sas0, sas1, and slen instructions, then no desynchronized operation was in progress. Pipeline control 108 recognizes this and via multiplexor control 330 allows memory access control registers 350 to be updated immediately by the new vector parameters 301 without having to use memory access control preload registers 340.

It may be that the second sas0 updated registers 306 and 308 rather than 326 and 328 due to the desynchronized execution of the sqrt but when the slen instruction was executed, the desynchronized execution had completed. In this case, when the desynchronized execution is completed, multiplexor control 330 updates registers 326 and 328 from registers 306 and 308 when the sqrt completed and allows the slen to write directly into register 322.

FIG. 3 represents a method where desynchronized execution may continue and allow additional instructions to execute even when those instructions have a resource contention because the arrangement of FIG. 3 resolves the resource contention. The particular example shown in FIG. 3 is illustrative and not limiting in scope.

Asynchronous Execution
======================

Asynchronous execution is a form of desynchronized execution when certain actions cannot be predicted or anticipated because they are beyond the control of the processor.

An example of this is the programmatic loading or saving of local memory with an external memory or device. If a program instruction initiates the procedure for an external process to read out the local RAM and do something with the data, such as save it to an eternal memory, then the pipeline control 108 (also called pipe control) (in FIG. 1), has no idea when that external process will actually read the local memory. Similarly, if a program instruction initiates the procedure for an external process to load new data into the local RAM then the pipe control, 108, has no idea when that data will actually be written and useable by the processor.

This example can be further elucidated by two instructions:

xload r1 r2 r3—load r2 bytes of data starting from external memory address r3 onward to local memory starting with address r1 onwards. That is, load the contents of external memory locations r3, r3+1, . . . , r3+r2−1 into the respective local memory locations r1, r1+1, . . . , r1+r2−1.

xsave r1 r2 r3—save r2 bytes of data from local memory address r3 onward to external memory address r1 onwards. That is, save the contents of local memory locations r3, r3+1, . . . , r3+r2−1 into the respective external memory locations r1, r1+1, . . . , r1+r2−1.

where r1, r2, and r3 are registers that contain the desired values for the operation.

Because it may take a significant amount of time for xload and xsave to carry out the operation, it would be preferable if pipe control 108 continues executing the instructions that follow the xload or xsave, just as it does for desynchronized execution. This variation of desynchronized execution is called asynchronous execution, as certain activities of the xload and xsave instructions are carried out asynchronously with respect to pipe control 108.

Asynchronous execution allows faster program execution performance. However the same sort of issue like resynchronization must be considered when there is a resource contention or data dependency. Resource allocation tracking 116 monitors for these issues while the asynchronous operations have not received an external indication of their completion, and when necessary, instructs stall detection 112 to halt pipe control 108 from executing instructions when a problem is encountered that necessitates the halting of instruction execution until the problem is resolved or the asynchronous operation is completed. This is not the same as resynchronization because the asynchronous operation may complete while a desynchronized vector operation is still in progress. However the instruction that had to wait for the asynchronous operation to complete can now execute even though a resynchronization of the desynchronized vector operation has not been performed.

Consider the xload instruction. Once it is issued by pipe control 108, at some unpredictable point in the future an external process will write to the local memory the data that is being retrieved from and external memory or external device. If the local memory does not have separate write ports for external writes and internal (processor generated) writes, then this is a resource contention. Even if multiple write ports are present, a future instruction may need to use the new data being loaded by the xload. This too is a resource contention, the resource being the data and the contention being the correct ordering of the loading of the data from the external source and the usage of the data by an instruction that follows the xload.

Consider the xsave instruction. Once it is issued by pipe control 108 (i.e. pipeline control 108), at some unpredictable point in the future, an external process will read the data from the local memory and save it to external memory or to an external device. If the local memory does not have separate read ports for the external reads and internal (processor generated) reads then this is a resource contention. Even if multiple read ports are present, a future instruction may write over the data that is still in the process of being saved by the xsave instruction. This too is a resource contention, the resource being the data and the contention being the correct ordering of the reading of the data before it is overwritten by new data.

Here is an example instruction stream:

```
mov r0 100
mov r1 64
mov r2 0x12345678
xload r0 r1 r2 // load 64 bytes into local mem[100,101, ..., 163] from external mem[0x12345678...]
add r7 r8 // these can be executed while the xload continues asynchronously
mul r7 r9
mov r9 500
store r9 r7 // writes r9 into local mem[500] - resource contention on memory write port with the xload
```

In this example, the xload is executed but the loading of new data into the local memory is performed asynchronously. The add and mul instructions can therefore be executed. But the store instruction needs to write data to the local memory. Since it is unpredictable when the xload will also write to the local memory, it is possible the store and xload will attempt to perform simultaneous writes which is not supported in a design with only one write port. Therefore, the store instruction must be stalled until xload has finished writing to the local memory. Resource allocation tracking 116 monitors the asynchronous xload, detects this contention, and instructs stall detection 112 to halt pipe control 108 from executing the store instruction until resource allocation tracking 116 determines the contention is resolved.

In this example, allowing xload to execute asynchronously gained some performance improvement, all the way up to the store instruction. But additional improvements can be made since the store instruction writes to a different memory location than the xload. It would be desirable for the store instruction and the instructions that follow to be allowed to execute while the asynchronous xload is still in progress.

One mechanism for such improvement is for the external process to request from the processor permission to write to the local memory and buffer the write data until such permission is given by pipe control 108. This may be perfectly satisfactory if only small amounts of data are to loaded from external memory but if a lot of data is being returned from external memory and permission from pipe control 108 to write to the local memory is delayed then the buffer may be unacceptably large. (If a very long running vector instruction is being executed desynchronized then pipe control 108 cannot interrupt it since it's desynchronized. It may take a long time to complete before it is no longer using the write port.)

Another mechanism that solves this problem and eliminates the buffer is for the external process to shut off the clocks to the vector processor, perform the writes then turn the vector processor clocks back on. This is like the vector processor becoming unconscious for a moment and during that time of zero activity the local RAM was written to and only then the vector processor became conscious again. From the perspective of the vector processor, it is as if the new data suddenly appeared in the local memory. This requires the local memory to be on a clock separate from the rest of the vector processor which is not shut off during this "unconscious" operation.

This "unconscious" operation does not solve all the problems. Consider the following instruction stream:

```
mov r0 100 // all the same instructions as before
mov r1 64
mov r2 0x12345678
xload r0 r1 r2
add r7 r8
mul r7 r9
mov r9 500
store r9 r7 // this instruction is now allowed to execute
etc // plus many more instructions
mov r9 100
fetch r7 r9 // fetch mem[100] and put it into r9 - this is a data contention
with the xload!!!
```

In this example, the fetch instruction retrieves data from the local memory that is being loaded by the prior xload. The fetch cannot be allowed to execute until the xload has written this data into the local memory.

Resource allocation tracking 116 monitors the local memory addresses associated with the xload and initiates the process for stalling any instruction that reads or writes a memory address in that range. This is an automated means of resolving the contention. Programmatic means may also or alternatively be made available. A programmer generally knows if they are prefetching data and when, later on in the program that data is being used. Therefore, an instruction such as xlwait (xload wait) can be used by the programmer to alert pipe control 108 that it needs to wait until an outstanding asynchronous xload has completed before continuing with instruction execution. This can lead to a simpler design by moving the onus to the programmer to ensure the race hazard is avoided.

Similar considerations pertain to the xsave instruction:
Pipe control 108 can issue an asynchronous execution of xsave and continue executing subsequent instructions until an instruction is encountered that has a memory read port contention.
Memory read port contention can be eliminated by allowing external logic to shut off the vector processor clocks.
Resource allocation tracking 116 monitors the local memory addresses associated with the xsave and initiates the process for stalling any instruction that modifies a memory address in that range.

An xswait instruction can move the onus to the programmer to indicate when instruction execution should stall until the asynchronous operation is complete.

xsave has an additional consideration regarding what it means for its operation to complete. In the case of xload, the operation is not considered complete until all the data has been loaded into the local memory. But for xsave, there are two points that could be considered complete:

all the data to be saved has been read out of the local memory all the data to be saved has been read out of the local memory and the external memory/device has acknowledged the receipt of such data.

The latter definition of complete allows the external memory/process to indicate that not only has the data been received (as in, the xsave saved it to a legal location) but to also indicate the integrity of the data received (as in, did it arrive with good parity, for example).

Most often, a program only cares for the former definition, i.e. that the data has been read from the internal memory even though it may not have yet been received and acknowledged by the external memory/device. This is because the program only cares that it can now continue execution and modify the data that was saved because the original state of the data is what is being saved.

But sometimes a program may need to know that the xsave is 100% complete in every way and that the external write has been acknowledged. For example, the data may be of such critical nature that if the data arrived with a parity error at the receiving end, the program may want to re-xsave the data until confirmation that good data was received has been acknowledged.

For this reason, there may be two variants of xswait that provides both variation of xsave-complete.

Figure 5:
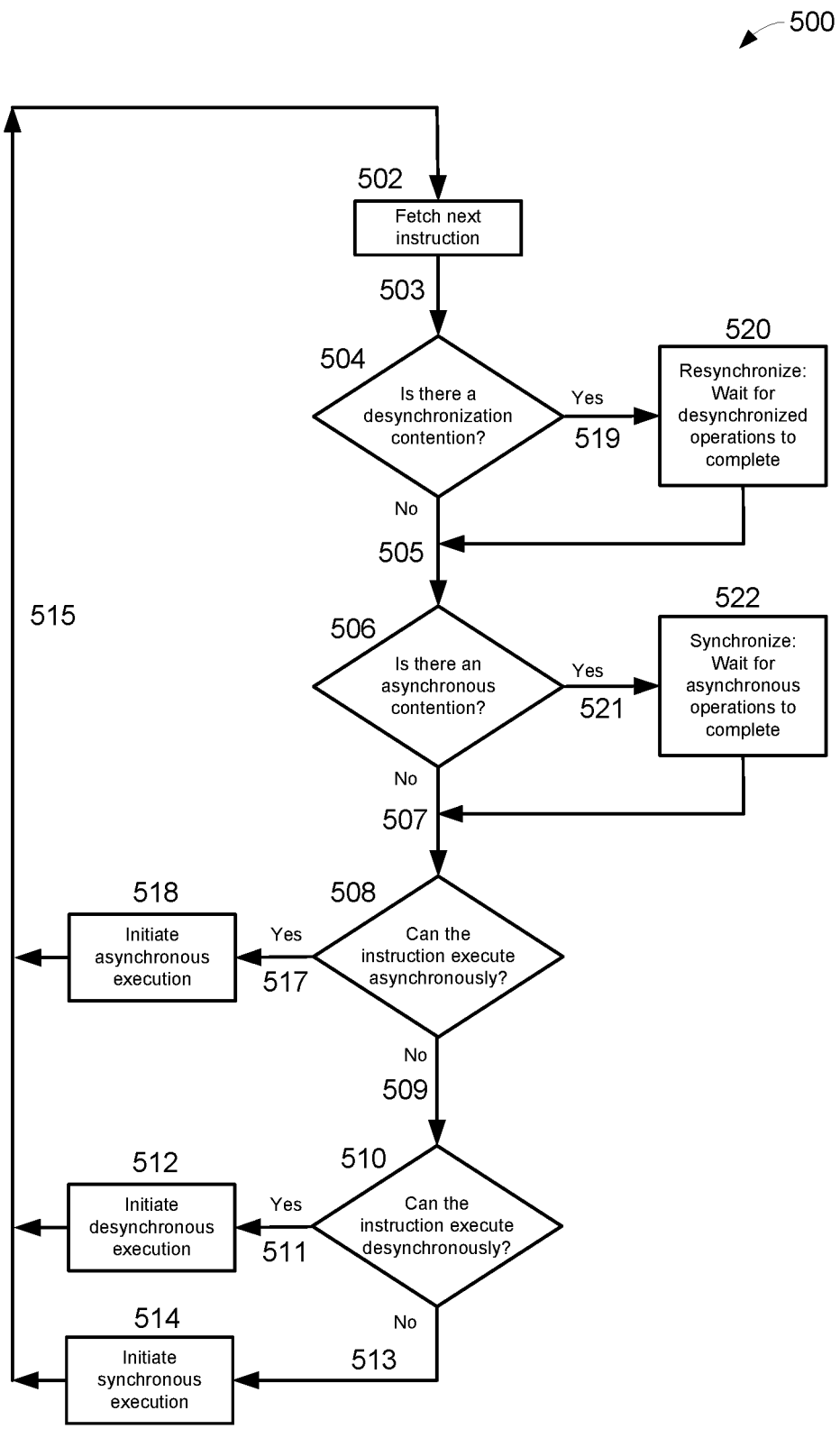
FIG. 5 illustrates, generally at 500, a flowchart showing asynchronous, desynchronous, and synchronous execution of an instruction.

FIG. 5 illustrates, generally at 500, a flowchart showing asynchronous, desynchronous, and synchronous execution of an instruction. At 502 fetch the next instruction to execute. The proceed via 503 to 504. At 504 determine if the fetched next instruction to execute affects or is dependent on the results of any current desynchronized instruction in progress, i.e. is there a desynchronization contention. When the fetched next instruction to execute affects or is dependent on the results of any current desynchronized instruction in progress (Yes) then go via 519 to 520. At 520 resynchronize execution by waiting for all desynchronized operations to complete before proceeding via 505 to 506. When the fetched next instruction to execute does not affect or is not dependent on the results of any current desynchronized instruction in progress (No) go via 505 to 506.

At 506 determine if the fetched next instruction to execute affects or is dependent on the results of any asynchronous operation in progress, i.e. an asynchronous contention. When the next instruction to execute affects or is dependent on the results of any asynchronous operation in progress (Yes), go via 521 to 522, otherwise if the next instruction to execute does not affect or is not dependent on the results of any asynchronous operation in progress (No) go via 507 to 508. At 522 synchronize execution by waiting for all asynchronized operations to complete before proceeding via 507 to 508. At 508 determine if the next instruction to execute can execute asynchronously. When the next instruction to execute can execute asynchronously (Yes), go via 517 to 518, otherwise if the next instruction to execute can not execute asynchronously (No) go via 509 to 510. At 518 initiate asynchronous execution by allowing the processor to execute the next instruction asynchronously.

At 510 determine if the fetched next instruction can execute desynchronously. When the next instruction can execute desynchronously (Yes) then proceed via 511 to 512. At 512 initiate desynchronous execution by allowing the processor to execute the fetched next instruction desynchronously, that is, the completion of the fetched next instruction occurs desynchronously with respect to the control of the processor but the processor tracks when an internal signal is given that indicates the operation is complete. The processor does not wait for this completion signal before continuing onto via 515 to 502.

When the next instruction cannot execute desynchronously (No) then proceed via 513 to 514. At 514 initiate desynchronous execution by allowing the processor to execute the fetched next instruction synchronously, that is, the instruction has the appearance to the program that it fully completes before continuing via 515 to 502. The processor may be pipelined or employ other overlapped execution techniques, however it does so in a manner that makes it appear to a program that it completes the instruction before continuing to 502.

Figure 6:
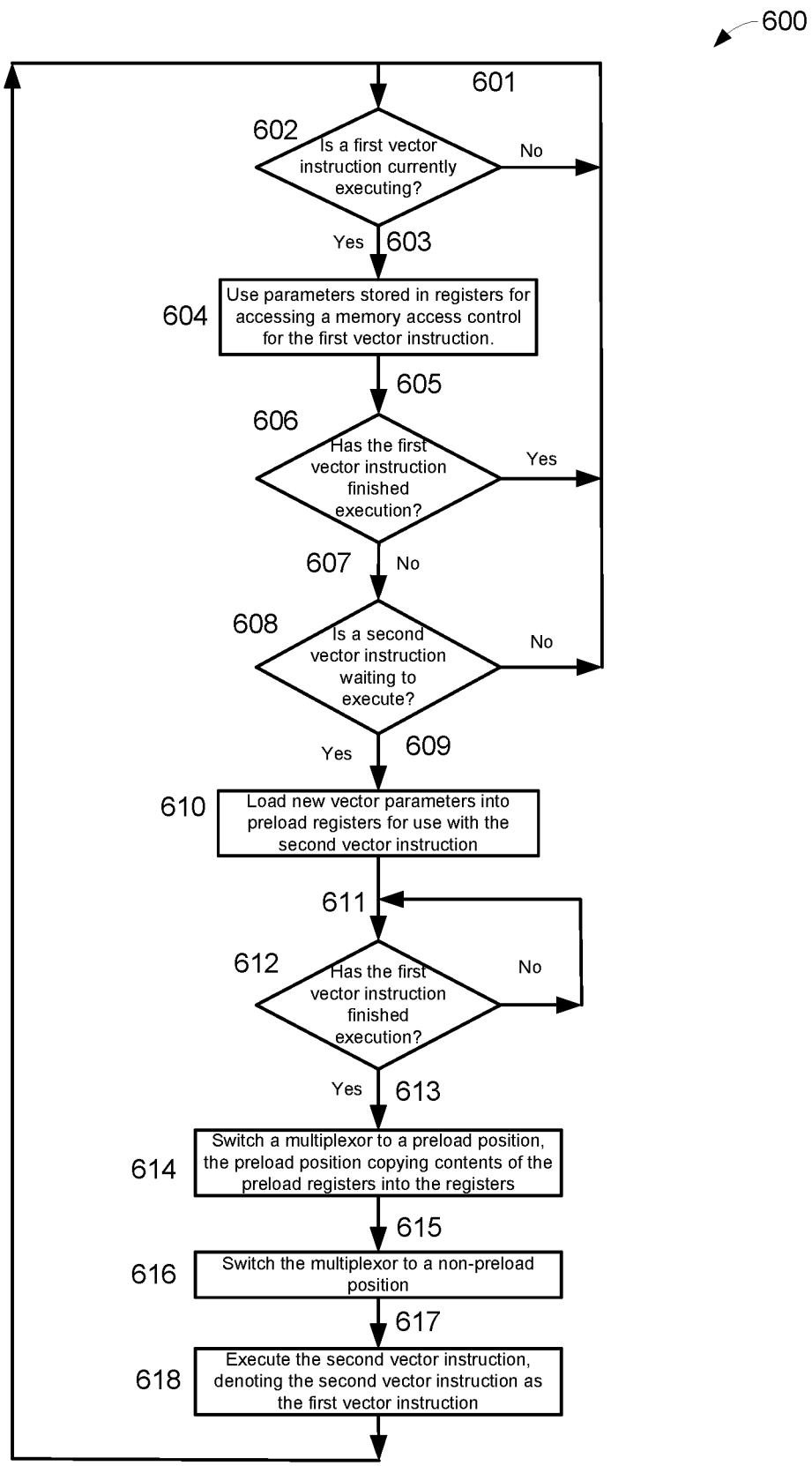
FIG. 6 illustrates, generally at 600, a flowchart showing execution of vector instructions.

FIG. 6 illustrates, generally at 600, a flowchart showing execution of vector instructions. At 602 a determination is made if a first vector instruction is currently executing. When the first vector instruction is not currently executing (No) then via 601 return to 602. When the first vector instruction is currently executing (Yes) then via 603 proceed to 604 and use parameters stored in registers for accessing a memory access control for the first vector instruction then proceed via 605 to 606.

At 606 a determination is made if the first vector instruction has finished execution. When the first vector instruction has finished execution (Yes) then proceed via 601 to 602. When the first vector instruction has not finished execution (No) proceed via 607 to 608.

At 608 a determination is made if a second vector instruction is waiting to execute. When a second vector instruction is not waiting to execute (No) then return via 601 to 602. When a second vector instruction is waiting to execute (Yes) then proceed via 609 to 610 and load new vector parameters into memory access control preload registers for use with the second vector instruction, then proceed via 611 to 612. At 612 a determination is made if the first vector instruction has finished execution. When the first vector instruction has not finished execution (No) then proceed via 611 to 612. When the first vector instruction has finished execution (Yes) proceed via 613 to 614. At 614 switch a multiplexor to a preload position thereby copying contents of the memory access control preload registers into the memory access control registers, then proceed via 615 to 616. At 616 switch the multiplexor to a non-preload position, then proceed via 617 to 618. At 618 execute the second vector instruction, denoting the second vector instruction as the first vector instruction, and returning via 601 to 602.

When the multiplexor is in the non-preload position it allows new vector parameters to be set up. For example, referring to FIG. 3, in the non-preload position multiplexor control 330 allows new vector parameters 301 to enter multiplexors 310, 312, 314, and 316, and to propagate respectively via 311, 313, 315, and 317 to vector length register 322, vector constant register 324, vector address register 326, and vector stride register 328, respectively.

When the multiplexor is in the preload position it allows new vector parameters to be set up from the memory access control preload registers 340. For example, referring to FIG. 3, in the preload position multiplexor control 330 allows new vector parameters 301 which have been loaded into vector length preload register 320, into vector constant preload register 304, into vector address preload register 306, and vector stride preload register 308 to enter multiplexors 310, 312, 314, and 316, via 303, 305, 307, and 309 respectively and to propagate respectively via 311, 313, 315, and 317 to vector length register 322, vector constant register 324, vector address register 326, and vector stride register 328, respectively.

Figure 7:
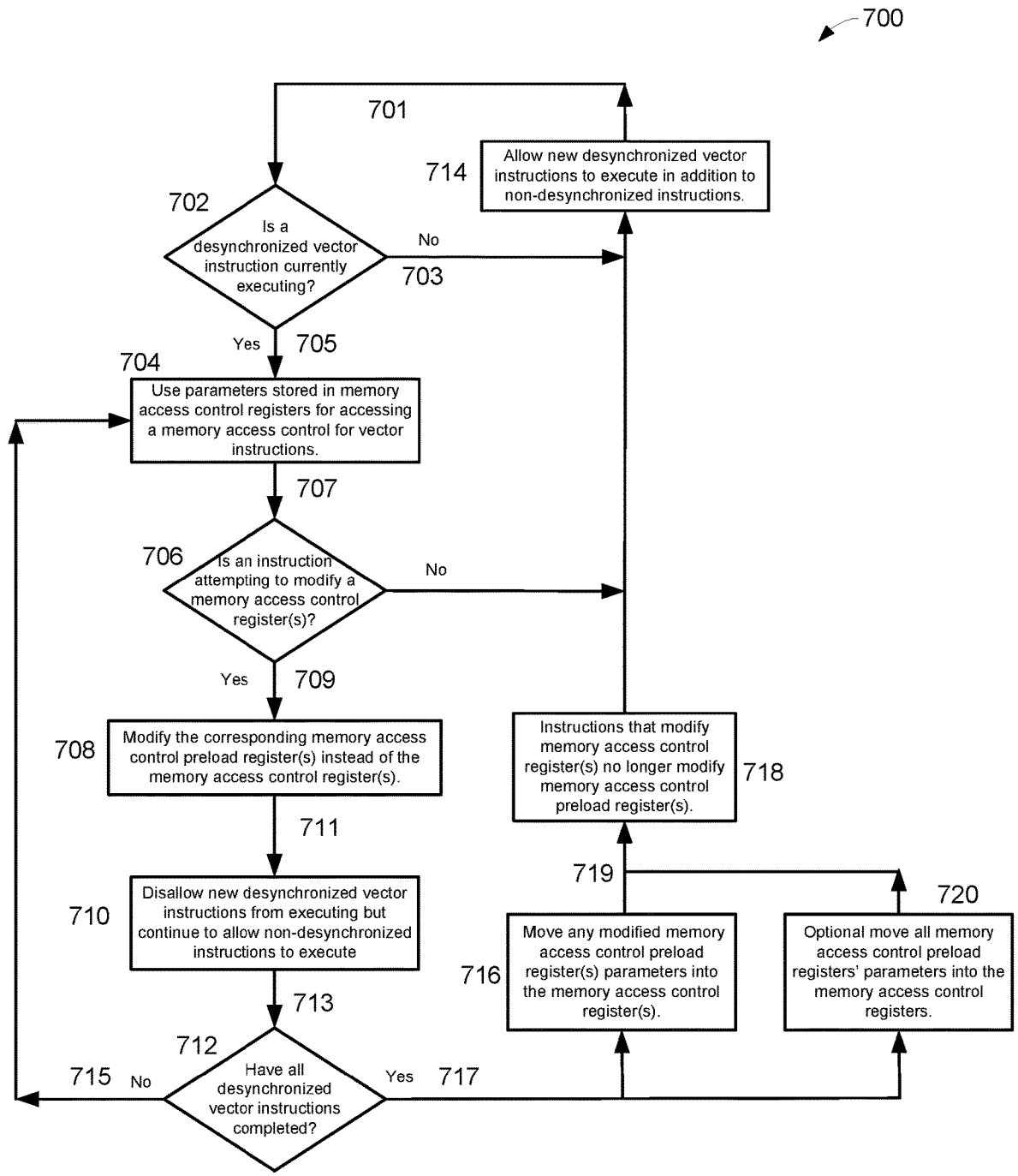
FIG. 7 illustrates, generally at 700, a flowchart showing execution of desynchronized vector instructions in addition to non-desynchronized instructions.

FIG. 7 illustrates, generally at 700, a flowchart showing execution of desynchronized vector instructions in addition to non-desynchronized instructions. At 702 a determination is made if a desynchronized vector instruction is currently executing. If a desynchronized vector instruction is not currently executing (No) then via 703 proceeds to 714. At 714 a new desynchronized vector instructions is allowed to execute in addition to non-desynchronized instructions, and it proceeds via 701 to 702.

If a desynchronized vector instruction is currently executing (Yes) then via 705 proceed to 704. At 704 use the parameters stored in the memory access control registers (e.g. FIG. 3 at 350) for accessing a memory access control for vector instructions, then proceed via 707 to 706. At 706 a determination is made if there is an instruction attempting to modify a memory access control register or registers (register(s)) (e.g. FIG. 3 at 350). When there is not an instruction attempting to modify a memory access control register(s) (e.g. FIG. 3 at 350) (No) then via 703 proceed to 714.

When there is an instruction attempting to modify a memory access control register(s) (Yes) then via 709 proceed to 708. At 708 modify the corresponding memory access control preload register or registers (register(s)) (e.g. FIG. 3 at 340) instead of the memory access control register(s) (e.g. FIG. 3 at 350), then via 711 proceed to 710. For example, using FIG. 3, the vector length register 322 has a corresponding vector length preload register 302. The example holds for vector constant register 324 and corresponding vector constant preload register 304. The example holds for vector address register 326 and corresponding vector address preload register 306. The example holds for vector stride register 328 and corresponding vector stride preload register 308.

At 710 disallow new desynchronized vector instructions from executing but continue to allow non-desynchronized instructions to execute, then via 713 proceed to 712.

At 712 a determination is made if all desynchronized vector instructions have completed. When all desynchronized vector instructions have not completed (No) then proceed via 715 to 704. When all desynchronized vector instructions have completed (Yes) then proceed via 717 to 716.

At 716 move any modified memory access control preload register(s) parameters into the memory access control register(s) and then proceed via 719 to 718. Optionally, at 720, move all memory access control preload registers parameters into the memory access control registers, without consideration as to whether they have been modified. For example, using FIG. 3, move all memory access control preload registers 340 parameters into the memory access control registers 350, using the multiplexor control 330.

At 718 instructions that modify memory access control register(s) no longer modify memory access control preload register(s), then proceed via 703 to 714. That is, for example, instructions that would modify memory access control registers (e.g. FIG. 3 at 350) can now do so rather than modifying the memory access control preload registers (e.g. FIG. 3 at 340). After 718, proceed to 714 to allow new desynchronized vector instructions to execute in addition to non-desynchronized instructions.

Relevance with respect to co-pending application Ser. No. 17/468,574, filed on Sep. 7, 2021.

==================================

These methods can be used with co-pending application Ser. No. 17/468,574, filed on Sep. 7, 2021. Co-pending application Ser. No. 17/468,574, filed on Sep. 7, 2021 describes a parameter stack, register stack, and subroutine call stack that are separated from the local memory, these stacks are used extensively by the vector ALU 124.

Consider the following instruction sequence, which is similar to a previous example on desynchronized execution:

```
mov r0 100
mov r1 1
sas0 r0 r1
sas1 r0 r1
mov r2 64
slen r2
sqrt v0 v1 // this could execute desynchronized
push r0 // as long as this does not have the stack in the same memory
the vector ALU uses!
push r1
push r2
call function_that_does_vector_log
```

Pushing/popping parameters onto/from a stack, saving and restoring of registers, and subroutine calls and returns are all very common operations and it is undesirable if they cause the resynchronization of desynchronized or asynchronous execution. Co-pending application Ser. No. 17/468,574, filed on Sep. 7, 2021 avoids this resynchronization and therefore is synergistic with the techniques disclosed herein.

Thus a Method and Apparatus for Desynchronizing Execution in a Vector Processor have been described.

For purposes of discussing and understanding the examples, it is to be understood that various terms are used by those knowledgeable in the art to describe techniques and approaches. Furthermore, in the description, for purposes of explanation, numerous specific details are set forth in order to provide a thorough understanding of the examples. It will be evident, however, to one of ordinary skill in the art that the examples may be practiced without these specific details. In some instances, well-known structures and devices are shown in block diagram form, rather than in detail, in order to avoid obscuring the examples. These examples are described in sufficient detail to enable those of ordinary skill in the art to practice the examples, and it is to be understood that other examples may be utilized and that logical, mechanical, and other changes may be made without departing from the scope of the examples.

As used in this description, "one example" or "an example" or similar phrases means that the feature(s) being described are included in at least one example. References to "one example" in this description do not necessarily refer to the same example; however, neither are such examples mutually exclusive. Nor does "one example" imply that there is but a single example. For example, a feature, structure, act, without limitation described in "one example" may also be included in other examples. Thus, the invention may include a variety of combinations and/or integrations of the examples described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more examples where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given to any combination.

Thus a Method and Apparatus for Desynchronizing Execution in a Vector Processor have been described.

What is claimed is:

1. A vector processor unit comprising:
a plurality of memory access control preload registers, each memory access control preload register having an input and an output, all the memory access control preload register inputs coupled to receive a new vector parameters;
a plurality of multiplexors, each multiplexor having a first input, a second input, a switching input, and an output, each of the memory access control preload register outputs coupled to the first input of a respective multiplexor, each of the second input of the respective multiplexor coupled to receive the new vector parameters;
a multiplexor control, each of the multiplexor switching inputs responsive to the multiplexor control;
a plurality of memory access control registers, each memory access control register having an input and an output, each of the memory access control register inputs coupled to the respective multiplexor outputs; and
a memory access control, the memory access control having a plurality of inputs, the plurality of memory access control register outputs coupled to the respective memory access control inputs.

2. The vector processing unit of claim 1 wherein the plurality of memory access control preload registers is selected from the group consisting of a vector length preload register, a vector constant preload register, a vector address preload register, and a vector stride preload register; and
wherein the plurality of memory access control registers is selected from the group consisting of a vector length register, a vector constant register, a vector address register, and a vector stride register.

3. The vector processing unit of claim 1 wherein:
the plurality of memory access control preload registers comprise a vector length preload register, a vector constant preload register, a vector address preload register, and a vector stride preload register; and
wherein the plurality of memory access control registers comprise a vector length register, a vector constant register, a vector address register, and a vector stride register.

4. A method comprising:
(a) fetching a next instruction;
(b) determining if there is a desynchronization contention with the next instruction;

(c) when there is the desynchronization contention with the next instruction then waiting for any desynchronized operations to complete;
(h) determining if the next instruction can execute desynchronously;
(i) when the next instruction can execute desynchronously then initiating desynchronous execution and then return to (a);
(j) when the next instruction cannot execute desynchronously then initiating synchronous execution and then return to (a),
wherein the desynchronization contention with the next instruction is determined by the next instruction not being 100% under control of a pipeline control.

5. The method of claim 4 comprising inserted in alphabetical order:
(d) determining if there is an asynchronous contention with the next instruction;
(e) when there is the asynchronous contention with the next instruction then waiting for any asynchronous operations to complete;
(f) determining if the next instruction can execute asynchronously;
(g) when the next instruction can execute asynchronously then initiating asynchronous execution and then return to (a).

6. A method comprising:
(a) determining if a first vector instruction is currently executing;
(b) when the first vector instruction is not currently executing then returning to (a);
(c) when the first vector instruction is currently executing then accessing a memory access control for the first vector instruction using vector parameters stored in registers;
(d) determining if a second vector instruction is waiting to execute;
(e) when the second vector instruction is not waiting to execute then returning to (a);
(f) when the second vector instruction is waiting to execute then loading new vector parameters into preload registers for use with the second vector instruction;
(g) determining if the first vector instruction has finished execution;
(h) when the first vector instruction has not finished execution then returning to (g);
(i) when the first vector instruction has finished execution then switching a multiplexor to a preload position so as to copy contents of the preload registers into the registers;
(j) switching the multiplexor to a non-preload position; and
(k) executing the second vector instruction, denoting the second vector instruction as the first vector instruction, and returning to (a).

7. The method of claim 6 comprising the multiplexor non-preload position connecting to a new vector parameters.

8. A method comprising:
(a) determining if a desynchronized vector instruction is currently executing;
(b) when the desynchronized vector instruction is not currently executing proceed to (c);
(c) allowing new desynchronized vector instructions to execute in addition to allowing non-desynchronized instructions to execute;

(d) using parameters stored in memory access control registers for accessing a memory access control for vector instructions;

(e) determining if an instruction is attempting to modify one or more memory access control registers;

(f) when the instruction is not attempting to modify the one or more memory access control registers then proceeding to (c);

(g) when the instruction is attempting to modify the one or more memory access control registers then modifying one or more corresponding memory access control preload registers;

(h) disallowing new desynchronized vector instructions from executing but continuing to allow non-desynchronized instructions to execute;

(i) determining if all desynchronized vector instructions have completed execution;

(j) when all the desynchronized vector instructions have not completed execution then proceeding to (d);

(k) when all the desynchronized vector instructions have completed execution then proceeding to (l);

(l) moving any modified memory access control preload registers parameters into the one or more corresponding memory access control registers; and (m) allowing instructions that modify memory access control register(s) parameters to no longer modify the corresponding memory access control preload registers parameter(s), then proceeding to (c).

9. The method of claim 8 wherein at (l) moving any modified memory access control preload register(s) parameters into the corresponding memory access control register(s) is by switching a multiplexor.

* * * * *